United States Patent [19]

Käch

[11] 4,173,390
[45] Nov. 6, 1979

[54] FIBER OPTIC T-COUPLER

[75] Inventor: Alfred Käch, Untersiggenthal, Switzerland

[73] Assignee: Patelhold Patentverwertungs- & Electro-Holding AG, Glarus, Switzerland

[21] Appl. No.: 763,826

[22] Filed: Jan. 31, 1977

[30] Foreign Application Priority Data

Mar. 16, 1976 [CH] Switzerland .......................... 3231/76

[51] Int. Cl.² .................................................. G02B 5/14
[52] U.S. Cl. ............................... 350/96.16; 350/96.18
[58] Field of Search ............................... 350/96 C

[56] References Cited

U.S. PATENT DOCUMENTS

| | | | |
|---|---|---|---|
| 3,611,359 | 10/1971 | Panerai | 350/96 B |
| 3,859,536 | 1/1975 | Thiel | 350/96.10 |
| 3,901,582 | 8/1975 | Milton | 350/96 C |
| 3,902,786 | 9/1975 | Brown | 350/96 C |
| 3,933,410 | 1/1976 | Milton | 350/96 C |
| 3,937,560 | 2/1976 | Milton | 350/96 C |

OTHER PUBLICATIONS

H. H. Bloem, D. J. Stigliani, Jr. "Fiber–Optic Coupler'- 'IBM Technical Disclosure Bulletin, vol. 16, No. 1, Jun. 1973, pp. 146–147.

*Primary Examiner*—Rolf G. Hille
*Attorney, Agent, or Firm*—Orville N. Greene; Frank L. Durr

[57] ABSTRACT

A fiber optic T-coupler comprised of solid primary and branch cores adapted to transmit light therethrough. The primary core is provided with a recess cooperating with the branch core, typically arranged at a right-angle with the primary core, to define a reflective surface whose surface area forms a ratio with the cross-sectional surface area of the primary core, which ratio corresponds to that between the light deflected by the reflective means into the branch core relative to the total light entering the primary core prior to deflection.

The reflective surface may be provided within the body of either the primary core or the branch core and plural reflective surfaces may be provided for handling bi-directional transmission or reception or for separating the transmission and reception of light.

20 Claims, 9 Drawing Figures

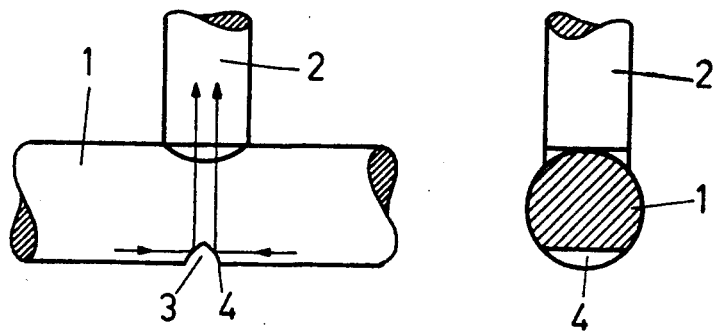
FIG. 1b
FIG. 1a
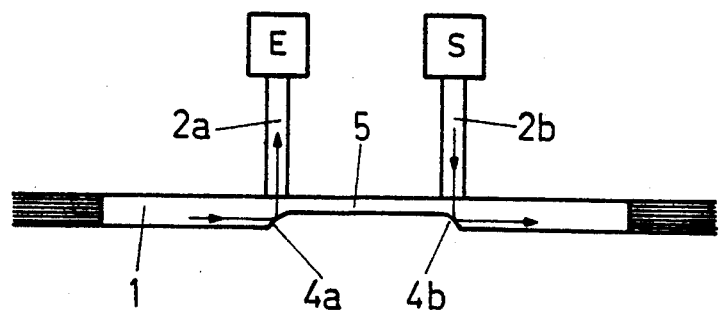
FIG. 2

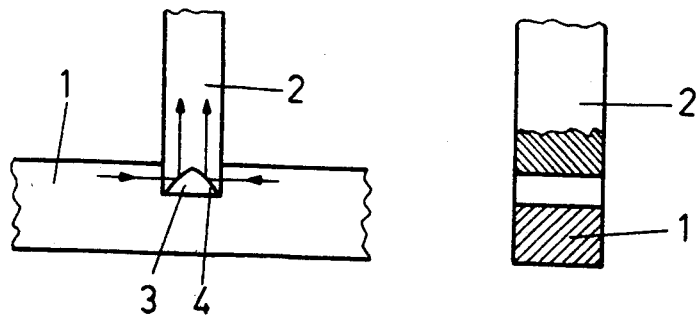
FIG. 3b
FIG. 3a
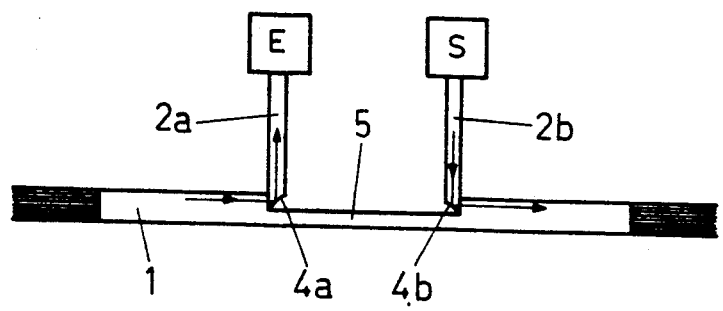
FIG. 4

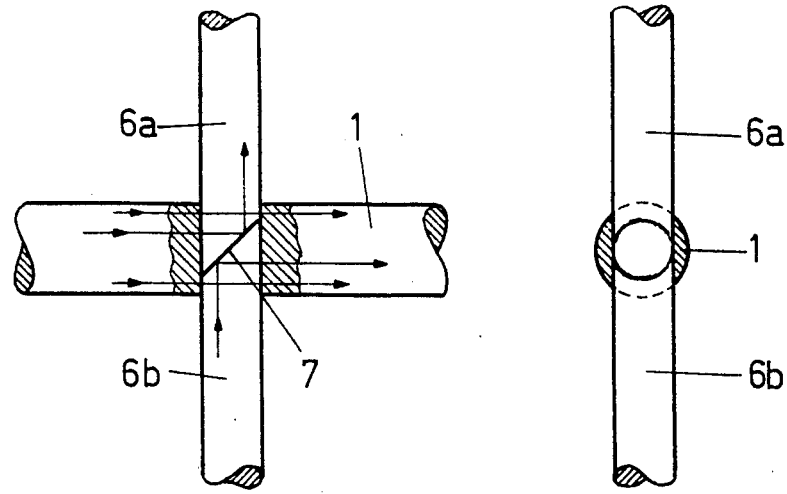
FIG.5b
FIG.5a
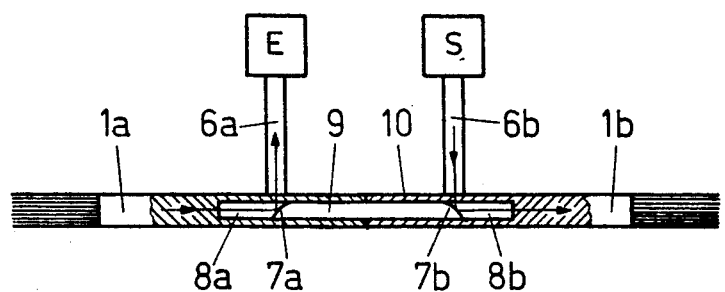
FIG.6

FIBER OPTIC T-COUPLER

BACKGROUND OF THE INVENTION

This invention relates to an optical-fibre T-coupler comprising solid-glass cores and reflective systems. Fibre-optics T-couplers are already known in embodiments including guide members and also provided with reflective arrangements. For example, in U.S. Pat. No. 3,883,217 there are described T-couplers in which two solid-glass cores arranged in series are interposed between the terminal surfaces of an interrupted primary fibre bundle and have the light guides of the coupled branches (receiver/transmitter) and also a direct connection applied to their inner surfaces. The incoming light signal is thus divided into a component led to the receiver and a component passing directly through the coupler. The light passing directly through the coupler and the transmitter signal injected in the same direction combine into a new transmitted signal at the coupler output. The two series-arranged solid-glass cores serve the function of a diffusor (randomiser, scrambler). Beyond a certain length of core, light entering at any point is distributed over the entire cross-sectional area of the core and thus passes uniformly into all the fibers of the outgoing fibre bundle. The relatively complex construction is a disadvantage. Six individual components are present in the device, of which the end faces must be exactly aligned and cemented. Even the construction of the fibre bundle providing the direct connection is not without problems.

In accordance with U.S. Pat. No. 3,870,396 right-angled isosceles glass prisms are interposed in the primary fibre bundle and the hypotenuse surfaces, positioned so as to be inclined relative to the direction of the transmitted light, are bridged by a reflector. This reflector is only partly reflective at the position at which the receiver signal is coupled out and is fully reflective at the position for the introduction of the transmitter signal. The arrangement is directional, so that two such couplers are necessary for duplex operation. The large coupling cross-sections which must subsequently be reduced, by way of guide transition sections (naturally accompanied by radiation losses or reflections) to the cross-section of the outgoing fibre bundle are a disadvantage. Exact adjustment of the individual coupling conditions at the partly transmissive reflector can also be far from simple.

A principal disadvantage of the T-coupler is known to be the relatively high transmission attenuation of the order of 3-4 dB resulting from the losses through the spacer and sheathing cross-section of the outgoing fibre bundle. Applications may be envisaged, however, in which these characteristics are of less importance.

OBJECT OF THE INVENTION

It is an object of the invention to provide an optical T-coupler which includes few individual components, does not require special alignment and may be cheaply manufactured.

BRIEF DESCRIPTION OF THE INVENTION

According to the present invention there is provided a fibre-optics T-coupler wherein a solid transparent primary core is interposed in the primary light path and reflective surfaces are provided at the coupling positions which deflect the incident light through at least approximately a right angle and are of such sizes in comparison to the total cross-section of the solid core that the deflected receiver signal corresponds to a predetermined ratio with respect to the light traversing the coupler directly.

BRIEF DESCRIPTION OF THE FIGURES

The invention will be further explained with reference to the accompanying drawings comprising FIGS. 1 through 6, in which housings and any necessary mountings have been omitted for the sake of simplicity in illustration. In the drawings:

FIGS. 1a and 1b show two schematic views of a coupler operating on the principle of coupling light in and out by means of a reflector system positioned in the side of the coupler opposite the branch connection;

FIG. 2 shows how the principle of FIGS. 1a and 1b may be modified for directional coupling;

FIGS. 3a and 3b show two schematic views of a coupler operating on the principle of coupling light in and out by means of a reflector system positioned on the side of the coupler adjacent the branch connection;

FIG. 4 shows how the principle of FIGS. 3a and 3b may be modified for directional coupling;

FIGS. 5a and 5b show two schematic views of a coupler operating on the principle of coupling light in and out by means of a reflector system arranged within the solid core;

FIG. 6 shows how the principle of FIGS. 5a and 5b may be modified for directional coupling; and FIG. 7 is an enlarged view of the reflective surface for FIG. 1.

DETAILED DESCRIPTION OF THE INVENTION

In the embodiment shown in FIGS. 1a and 1b, reference 1 denotes a solid glass core included in the primary transmission path and 2 denotes a branch leading, for example, to a receiver, the branch likewise being in the form of a solid glass core. Opposite the position of the branch 2 there is formed in the core 1 a triangular notch 3, of which the surfaces 4 are mirror coated and are inclined to the axis of the light guide at an angle which is at least approximately 45°. Thus, as is indicated by arrowed lines, a part of the light entering the core 1 is deflected into the core 2. The solid cores are arranged as diffuser rods, that is, their length, taken from the coupling point to the coupled fibre bundles (not shown in FIGS. 1a and 1b) should be at least 10 times their respective diameters. Core 2 is advantageously optically coupled to core 1 by cement indicated at 11.

In the arrangement shown in FIG. 2, two separate couplings 2a, 2b are provided on the primary core, for the purpose of directionally separate coupling in and coupling out of light, for example, in networks of ring form. For this purpose the solid core 1 has a trapezoidal shaped recess about its centre. The terminal faces 4a, 4b of the recess are inclined at 45° opposite the positions of the T-couplers 2a, 2b, while the long face 4c bounds the direct connection 5 extending between the two T-couplers. At the reflective surface 4a a part of the incident light is, as illustrated, deflected at a right angle into the guide 2a leading to the receiver E. By the reflector 4b, the light signal coming from the transmitter S over the guide 2b is injected into the primary guide again in the original direction of transmission. The cross-section of the direct connection 5 is smaller than the full cross-section of the primary core 1 by an amount determined by the percentage of the light intensity received in the coupler that is diverted by means of the reflector 4a into the receiver branch. At the position at which the transmitter is coupled-in by means of the reflector 4b the smaller cross-section of the connection 5 is again increased to the full cross-section of the coupler output. Under these conditions the losses for light which traverses the coupler directly are kept to a minimum. By means of the relative reduction in cross-section of the connection 5, the power coupled-out to the receiver may be given a predetermined ratio to the light intensity incident on the coupler.

The coupling of the branch core 2 (FIG. 1) or of the cores 2a, 2b (FIG. 2) to the primary core 1 is not critical. In any case, however, the optical relations must be such that as full use as possible is made of the received light. There are in principle several possibilities, in accordance with the degree of coupling. With strong coupling (e.g. 3 dB corresponding to half the primary cross-section) the transition should be optically homologous, which can readily be achieved by cementing, as indicated at 11, in FIG. 1. For weaker coupling on the other hand, it is possible, as indicated in FIG. 2, for the branch cores 2a, 2b to merely abut the primary core 1, without cementing. The curvature of the surface of the primary core opposed to the reflective surfaces in fact effects a considerable focusing of the incident light, as in a cylindrical lens. In addition, it is possible to provide the reflector surfaces with a convex curve of appropriate curvature in the longitudinal direction of the primary guide 1, so that light transmission similar to a plano-convex lens results.

In the coupler systems in accordance with FIGS. 3a, 3b and 4, the recesses in the primary guide 1 are of rectangular form and are placed on the side of the guide which faces the coupling guides. Here the reflector surfaces for deflecting the light are, as shown, on the end faces of the coupled guides. FIGS. 3a and 3b show the construction for bi-directional transmission, while FIG. 4 shows the arrangement for directionally separated transmission. Preferably, a rectangular or square cross-section of the guides is used here, since optimum conditions for light transmission can then be easily achieved. The mode of operation is in general the same as for the arrangements of FIGS. 1a, 1b and 2.

Finally, FIGS. 5a, 5b and 6 show arrangements in which the 45° diverting reflectors are arranged concentrically in a circular primary core. Both of the systems are arranged for directionally separate operation. In FIGS. 5a and 5b the primary core is provided with a cylindrical bore arranged at a right angle to the longitudinal axis of core 1 and adapted to receive the two coupling guides 6a, 6b. Between the end surfaces of the two guides, inclined at 45°, is a metallic foil 7 which is reflective on both sides to deflect the incident light appropriately for both opposing directions. A thin air-gap may be employed instead of the foil, reflection then resulting from the difference in the refractive indices of the material of the guides 6a, 6b and of air. The degree of coupling to the receiver is again determined by the ratio of the diverted cross-section to the full primary cross-section.

In the construction shown in FIG. 6, the primary core is divided into two preferably similar portions 1a, 1b. From the meeting plane $P_M$ there are formed two inwardly directed blind bores which contain light-transmissive inserts 8a, 8b, as well as a preferably metallic peg-shaped spacer 9, of which the ends 7a, 7b, sloped at 45°, are reflective. Light falling on the reflective surfaces 7a, 7b is thus, as indicated, diverted into the guide 6a to the receiver E and from the transmitter S over the guide 6b into the primary core portion 1b. With accurate optical cementing of the components 8a, 8b and 9 with guide portions 1a, 1b only the reflective surfaces 7a, 7b appear in the light transmission path. In principle the inserts 8a, 8b could even be omitted, but this would necessitate exact optical finishing of the end faces of the blind bores, or the supporting spacer 9 could be provided with perpendicular end surfaces and the 45° end surfaces of the inserts 8a, 8b could be made reflective, and so on, though however, no substantial advantage would result. For light transfer between the coupling guides 6a, 6b and the primary core 1, the lens effect of the surface curvature of the primary core already explained with reference to FIG. 1, is advantageously made use of. With additional cylindrical curvature of the reflective surfaces 7a, 7b in the plane of the beam there may again be obtained a focusing action similar to that of a plano-convex lens. It is true that this assumes that the two inserts 8a, 8b are present so that the material in the vicinity of the reflective surface has a refractive index about equal to that of the primary core. In addition, the coupling guides 6a, 6b may also be mutually rotated through any angle, instead of lying in a common plane, as shown. The concentric introduction into the primary core 1b of the light transmitted directly into the coupler through the connection 10 surrounding the blind bores and of the transmitter signal coupled in by way of the reflector 7b effects advantageous homogenisation of the light distribution particularly suitably. The amount of receiver coupling is determined in principle by the width of the blind bore in comparison to the full cross-section of core 1a.

The possibilities are shown in principle in the first place by the arrangements represented in FIGS. 1–6. In addition, other analagous modifications are also possible, for example, to form on the primary core 1 two sawtooth-shaped recesses at diametrically opposed positions each having a 45° inclination, or to form the trapezoidal or rectangular recesses in the primary core (in accordance with FIG. 2 or FIG. 4) merely as grooves. Any transparent material (silicate glass, transparent acrylic material) may be used as the solid-glass core. Instead of being circular in form the guide cross-sections may if necessary be square or rectangular and the ends of the fibre bundle may readily be adapted to either form. For the purpose of homogenising the mixing of the light the solid core may in addition contain suspended light-scattering centres or diffusing plates arranged at certain distances, forming a milky translucent material. In some cases optically true surfaces of the guide material may be used instead of mirrors for diversion of the light, so that the reflection takes place as a result of the difference in the refractive indices of the guide material and of the surrounding air.

While the degree of coupling of the receiver corresponds more or less to the ratio of the coupling surface to the primary transmission cross-section, at the transmitter it is practically equal to one. This difference is significant insofar as, in a linear fibre network, large section attenuations are thus acceptable, or more stations may be interposed for optimum transmission conditions. Maximum transmitter coupling requires concentration of all of the transmitted light upon the small cross-section of the respective coupling area. This is possible, for example, if a light-emissive diode or laser diode is used as the light source, the active radiating surface of which is smaller than or at most equal to the coupling-in cross-section of the reflector surface. The transmitting medium may then be merely an homogeneous light guide matched to the required transmission cross-section.

In the arrangements providing directional coupling, there is a marked decoupling between the two branches, which may be significant in certain applications of the coupler system. Solid material is advantageously employed for the receiver and transmitter coupling guides, because of the low intrinsic losses, especially for short lengths. However, the receiver and transmitter diodes may also be arranged on the primary core 1, directly opposite the respective reflector surfaces. In such a case the coupler may be advantageously placed in a common housing together with the receiver and transmitter.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A fiber-optics T-coupler comprising:
    a solid transparent primary core provided for transmitting a light therethrough, said primary core having a circular cross-section;
    a branch core arranged at right angles to said primary core and forming said T-coupler;
    said primary core having at least one recess formed therein, said recess provided with means defining a reflective surface for deflecting light passing through said primary core and incident upon said reflective surface towards said branch core, said reflective surface having a curvature which cooperates with the curvature of said cross-section of said primary core to transmit light travelling in the longitudinal direction of said primary core onto said reflective surface and into said branch core in a manner similar to that of a plano-convex lens.

2. The coupler of claim 1 wherein said recess is provided with a surface diagonally aligned relative to the longitudinal axis of the primary core; said branch core being arranged with one end thereof adjacent the surface portion of the primary core opposite said diagonally aligned surface which defines said reflection means.

3. The coupler of claim 1 wherein said recess comprises a substantially V-shaped recess formed in said primary core such that the surfaces of said recess are diagonally aligned relative to the longitudinal axis of the primary core;
    said branch core having a first end positioned adjacent the surface portion of the primary core directly opposite said recess to receive light deflected from either or both of said diagonally aligned surfaces.

4. The coupler of claim 1 wherein said recess has a trapezoidal shape defined by a base surface arranged between two diagonally aligned side surfaces arranged at opposite ends of said base surface and being aligned diagonally with the longitudinal axis of the primary core, said branch core having one end positioned adjacent the surface portion of the primary core opposite one of said diagonally aligned surfaces so as to receive light deflected from said surface toward said branch core.

5. The coupler of claim 4 further comprising a second branch core having one end positioned a spaced distance from the first mentioned branch core and adjacent the surface of said primary core immediately opposite the remaining diagonally aligned surface for directing light toward said remaining diagonally aligned surface for deflection of the light in a direction parallel to the longitudinal axis of the primary core.

6. The coupler of claim 1 wherein said primary core has a substantially rectangular shaped recess and said reflection means comprises a V-shaped notch formed in one end of said secondary core; the notched end of said secondary core being positioned within said recess with the surfaces defining said V-shaped notch being arranged diagonally to the longitudinal axis of said primary core for respectively either deflecting a portion of the light entering the primary core into said branch core or deflecting light passing from the branch core into the primary core.

7. The coupler of claim 1 wherein the recess formed in said primary core is substantially rectangular in shape and is provided with a base portion separating first and second side wall portions aligned substantially perpendicular to the longitudinal axis of the primary core;
    said branch core having a first end positioned in said recess, said first end having a surface area arranged diagonally relative to the longitudinal axis of said primary core whereby light transmitted along said primary core and impinging upon said diagonally aligned surface is deflected to move outwardly along said branch core.

8. The coupler of claim 7 further comprising a second branch core having a first end positioned within said primary core recess adjacent the remaining one of said recess side surfaces, the end surface of said second branch core being arranged diagonally relative to the longitudinal axis of said primary core so that light passing through the branch core toward said diagonally aligned surface is deflected into said primary core.

9. The coupler of claim 1 wherein said recess comprises a cylindrical bore provided in said primary core, the longitudinal axis of said cylindrical bore being at right angles to the longitudinal axis of the primary core;
    said branch core having a first end positioned within said bore;
    the end surface of said first end being aligned diagonally relative to the longitudinal axis of said primary core.

10. The coupler of claim 9 comprising a second branch core and having a first end inserted into said bore whereby the end surface is parallel to the end surface of the first mentioned branch core.

11. The coupler of claim 10 further comprising reflective means positioned between the end surfaces of the branch cores and being reflective on both surfaces thereof.

12. The coupler of claim 1 wherein said recess means comprises a hollow cylindrical shaped interior formed in said primary core and having an inner diameter which is less than the outer diameter of said primary core;
    means provided in said hollow interior region and having a diagonally aligned reflective surface;
    said branch core having a first end positioned adjacent to said primary core so that light passing through said primary core and impinging upon said reflective surface enters into said branch core or, alternatively, so that light passing along said branch core and toward said reflective surface passes from said branch core into said primary core and is deflected along said primary core in a direction parallel to the longitudinal axis of the primary core.

13. The coupler of claim 12 further comprising second diagonally aligned reflective means positioned within said hollow region a spaced distance from said first mentioned reflective means and being diagonally aligned relative to the longitudinal axis of said primary core to function in a manner substantially similar to the first mentioned reflective surface.

14. The coupler of claim 12 wherein said reflective means comprises a solid core member positioned within said hollow interior region and having one diagonally aligned end surface arranged at a location corresponding with the location of said branch core.

15. The coupler of claim 14 wherein said end surface is provided with a reflective member mounted thereon.

16. The coupler of claim 15 wherein said reflective member is a metal foil which is reflective on both faces thereof.

17. The coupler of claim 1 wherein said primary core is cylindrical and said reflective surfaces have a convex cylindrical curvature in the plane of the incident light so that, in conjunction with the curvature in a plane perpendicular to the plane of the outer surfaces of the primary core the curvature provides a focusing effect similar to that provided by a plano-convex lens.

18. The coupler of claim 10 wherein the parallel aligned faces of the first and second mentioned branch cores are arranged a spaced distance apart wherein the region defined by said gap has the refractive index of air.

19. The coupler of claim 12 wherein a spacer member is positioned within said hollow interior region and is provided with reflective end faces inclined at a 45° angle relative to the axis of the primary core.

20. The coupler of claim 19 wherein the amount of light deflected by the diagonally aligned end surface thereof is less than the amount of light traversing the primary core.

* * * * *